United States Patent [19]

Cornier

[11] Patent Number: 5,232,753
[45] Date of Patent: Aug. 3, 1993

[54] CRYSTAL FLASK TREATED WITH AN ALUMINO-SILICATE SLIP AND HEAT

[75] Inventor: Gérard Cornier, Sainte Marguerite, France

[73] Assignee: Compagnie Des Cristalleries de Baccarat, Baccarat, France

[21] Appl. No.: 775,202

[22] Filed: Oct. 11, 1991

Related U.S. Application Data

[62] Division of Ser. No. 696,016, May 6, 1991.

[30] Foreign Application Priority Data

May 23, 1990 [FR] France ................... 90 40046

[51] Int. Cl.$^5$ ............................................. C03C 15/00
[52] U.S. Cl. .................................. 428/34.4; 65/30.13;
65/60.53; 65/60.8; 51/318; 427/230; 427/376.2;
428/428; 428/432; 428/701; 428/410
[58] Field of Search ............ 65/3.14, 3.15, 30.13,
65/60.53, 60.80; 427/374.7, 397.8; 501/60, 74;
51/319; 428/34.4, 543, 428, 432, 701, 410

[56] References Cited

U.S. PATENT DOCUMENTS 4,874,414 10/1989 Kaite et al. ................... 65/30.15
4,983,199 1/1991 Dumas ........................ 65/60.8

OTHER PUBLICATIONS

Knapp, "Optical Glasses," The Glass Industry 465–471 (1938).
The Glass Industry, vol. 28, No. 6, Jun. 1947, pp. 300–302, and 324–326.

Primary Examiner—Michael Lusigan
Assistant Examiner—Benjamin L. Utech
Attorney, Agent, or Firm—Fulwider, Patton, Lee & Utecht

[57] ABSTRACT

An article made by treating the surface of a solid article made of a material having a vitreous structure, such as crystal, lead glass and the same, and containing some amounts of heavy metals such as lead, said surface being liable to be into contact with products of acid character, such as alcohols e.g. cognac, whisky, wines or fruit juices, or acid foodstuffs, with a view to prevent said heavy metals from drifting into said acid products, characterized in that it comprises forming in a superficial area of said surface, after partially removing the lead ions from said area, a silico-aluminous diffusion barrier opposing said drift into said acid product, by ion exchange between said material having a vitreous structure and a coating temporarily laid upon said surface, said coating comprising a silico-aluminous crust resulting from the heating of a kaolin layer laid upon said surface under the form of a thixotropic slip of pure hydrated aluminum silicate.

9 Claims, 1 Drawing Sheet

CRYSTAL FLASK TREATED WITH AN ALUMINO-SILICATE SLIP AND HEAT

This application is a divisional of U.S. patent application Ser. No. 07/696,016, filed May 6, 1991.

This invention relates to a process for treating the surface of a solid article made of a vitreous material and containing some amount of heavy metals, said surface being liable to come into contact with products of acid characteristics, in order to prevent said heavy metals from drifting into said products.

These "articles made of vitreous material" refer to the lead glasses, the crystal and similar materials used under solid shape, i.e. having no specific superficial characteristics (articles made of a vitreous lead containing material) "heavy metals" refer to metals such as lead, barium, cadmium and the same, which can be dangerous for human health if they come into contact for a long time with food or beverages; "products of acid characteristics" refer to alcohols such as cognac, whisky, wines as well as to fruit juices and aggressive pasty products like mustards and to any other acid foodstuffs.

As a detailed illustrative example of the process of the invention, the application of this process will be now described to the treatment of lead glass or crystal flasks designed to be filled with alcohols in order to prevent the drift or migration of the lead contained in the internal surface of said flasks into said alcohols.

It should be understood that the term "lead glass" means any lead containing glass, and obviously crystal itself, i.e. any glass containing at least 24% by weight lead oxide (Pbo).

It is well known that any liquid contained in any container or receptacle made of any material has a tendency to dissolve some quantity of chemical constituents of said material. Said quantity is generally extremely low. As an example, water contained in a container made of sodocalcic glass will dissolve some $Na_2O$ of said glass. A standard test (DIN 1211) provides a comparison in the hydrolytic resistance of said sodocalcic glasses (dissolution of 30 to 1000 µg $Na_2O$ per gram of powdered sodocalcic glass in water at 90° C. during 1 hour).

This general phenomenon is to be considered in analytical chemistry and in some branches of fine chemistry, but it is generally without incidence in the daily life, except in very specific situations such as the case of some heavy metals as lead, barium and cadmium which have the tendency to drift into the foodstuffs when they are components of the materials used for making household utensils or containers to contain beverages. As an example, crystal contains lead oxide (AFNOR STANDARD: NF 30.004) and it has been ascertained that some amount of lead, in the ppm range can drift into acid products (pH=3.5) when said products are kept in crystal containers for a comparatively long period.

This situation has been seriously investigated and has led to international regulation standards "in order to ensure the protection of the population against possible dangers due to the contact between foodstuffs with the surface of articles made of glass used for the preparation, the service and the conservation of foods and beverages" (International Standard ISO 7086/1-1982).

In some countries, the health controlling authorities have now a tendency to strongly recommend maximum lead contents in alcoholic beverages, which will become a problem as well for crystal flask producers as for high value alcohol traders presenting their products in such flasks.

A first solution to this problem has been proposed by the Applicant in the U.S. Pat. Nos. 4,981,733 and 4,983,199 describing a process for making a container made of crystal for containing any product and drink with acid characteristics, characterized in that in order to prevent the lead from migrating from the crystal to the products and drinks, the container has on its internal surface a thin and continuous film made of unleaded glass forming a "screen".

Said process comprises the following steps:
gathering a predetermined quantity of flowable unleaded glass into a drop shape;
gathering a parison of crystal over said unleaded glass so as to cover said unleaded glass, said leaded glass and said crystal having close the same coefficient of expansion and index of refraction and,
blowing said crystal and unleaded glass together to a desired container configuration having a cavity with an internal surface for holding a product in the container, the entire internal surface being covered with a continuous film of said unleaded glass.

While said solution is quite satisfying, searches have been continued to find out some alternatives still more attractive.

The present invention is indeed a new process for reaching the same result, i.e. to prevent migration of lead ions contained in a lead glass or crystal container into an acid liquid product contained in said container. This process is based upon a fully different basic concept, according which instead of isolating the liquid from the crystal, it is created in a superficial area of flask inner wall, after partially removing the lead ions contained in said area, a diffusion barrier hindering the remaining lead ions to pass from the crystal into said acid product.

To this effect, it is used a well known phenomenon, i.e. ion exchange, and more specifically a cation exchange between lead and alkali metal cations contained in crystal and $H^+$ and $Al^{3+}$ cations contained in a material brought into contact with crystal in specific conditions.

It is indeed known that the hydrolytic attack of glasses by an acid liquid can be considered as an ionic exchange between the $H^+$ in excess in a solution and the loose cations of the vitreous network, silica remaining practically unchanged. Such an exchange is practically limited to the network modifiers (alkaline and alkaline earth metals) and to some heavy metals such as lead, cadmium and barium (inasmuch they are present in the solid).

Starting from this concept, it has already been proposed to limit the migration of lead by several methods comprising removing the lead from a superficial area of various thickness in an article wall by using aqueous acid solutions before using said article. The disadvantage of such methods is to be found in the additional steps and handlings it gives rise and moreover in the poor results obtained, if in the same time the safety and time obligations are kept consistent with the industrial production requirements.

In fact, in the technical field of the lead glasses and crystal compositions the ionic exchange kinetics between the lead in the wall and the cations in a liquid is governed by the second Law of Fick, i.e. the amount of dissolved lead is proportional to the square root of the contact time, while the diffusion coefficient is an ARRHENIUS function of the temperature. On the other hand the leaching of articles by acid solutions can be only carried out at comparatively low temperature, less than the boiling point of the used liquids, along practical conditions and contact time limited by the industrial requirements. In addition, the safety requirements make the use of strongly concentrated acids practically difficult.

The result thereof is that, in all cases, the amount of lead which is actually extracted from the container wall is comparatively very small so that a further contact between the so treated container and an acid liquid results soon again in a diffusion of lead into the liquid which becomes measurable after a few days only: the diffusion speed remains practically the same as before treatment, so that said treatment has for only result a small postponement of the phenomenon, such a postponement being inadequate in view of the storage periods which can reach several years.

The process of this invention departs from those prior methods and results in preventing the migration of the lead contained in a lead glass or crystal container from this container wall into a liquid contained in said container, as well during a prolonged period, e.g. for alcohols contained in crystal flask, as during a comparatively short period, e.g. for strongly acid products such as vinegar containing preparations (sauces, mustard) contained in lead glass containers or pots.

To obtain such a result, the process of the invention makes use on the one hand of high temperatures and on the other hand of compounds able to exchange or release $H^+$ and $Al^{3+}$ ions at said high temperature.

Basically, the invention has for its object a process for treating the surface of a solid article made of a material having a vitreous structure, such as lead glasses, crystal and the same, containing some amounts of heavy metals, such as lead, said surface being liable to be in contact with acid products, such as alcohols, more specifically cognac, whisky, wines and fruit juices and similar foodstuffs, with a view to prevent said heavy metals from drifting or migrating from said surface into said acid products, said process comprising creating in a superficial area of said solid liable to be in contact with said acid products, after partially removing the lead ions contained in said area, a silico-aluminous diffusion barrier opposing said drift or migration into said product, by ion exchange between said solid article and a layer temporarily applied to said surface, said layer comprising itself a silico-aluminous crust resulting from heating a kaolin layer applied onto said surface as a thixotropic barbotin or slip made of pure hydrated aluminum silicate and water.

Practically the process of the invention consists
in applying upon the surface of the article, liable to be in contact with and acid product, a thixotropic slip in the viscous state,
in emptying the article while keeping on said surface a continuous layer of said slip adhering to said surface,
in heating said article with said coating at a temperature between 300° C. and the softening temperature of the lead glass or crystal forming the article for a few hours, then, after cooling,
in eliminating by washing the silico-aluminous crust resulting from said heating.

Barbotin or slip refers to a thixotropic water suspension of compounds such as phyllosilicates or tectosilicates e.g. clays, kaolins, montomorillonites and zeolites, and more specifically an hydrated aluminum silicate which retains constitution water up to high temperatures at which the crystal cations are exchanged with the kaolin cations with the at a sufficiently high speed to be consistent with industrial time requirements.

A first explanation of the phenomenon used to carry out the invention would be the following:

The considered crystalline solids are all characterized by structural arrangements in octahedric layers or tetrahedric layers in which the overall electric charge thereof is deficient in positive charges due to the replacement of $Si^{4+}$ cations by cations such as $Al^{3+}$. The excess negative charge is therefore compensated by other cations, mainly monovalent cations ($H+$, alkaline metals) and sometimes bivalent cations (alkaline-earth metals). Such "compensating" cations can be exchanged with other species. The number of negative charges so compensated by exchangeable cations is called "cationic exchange capcity" (CEC) or "base exchange capacity" (BEC).

It should be noted that as of 1945 (cf "The Glass Industry", vol. 26 nb 6, Jun. 1945, nb 7 Jul. 1945 and nb 6, Jun. 1947), some authors have already shown some possibility of ionic exchange at high temperature between the $H+$ ions of meta-kaolin and the alkali metal ions of sodo-calcic glasses, and even considered an application thereof, i.e. an improvement of durability and of some other properties (mechanical and electrical) of said sodo-calcic glasses.

However, the practical handlings required in such a process have resulted in the abandonment thereof.

Such prior studies have therefore been limited to the exchange between the sodium of the sodo-calcic glasses and the $H+$ ions of meta-kaolin, being kept in mind in addition, that the difference between such an ionic exchange at high temperature and a leaching at room temperature as mentioned above, would be found in the kinetics of the process on the one hand, and in the surface state after treatment on the other hand.

Now, it has been shown that with the process of the invention, at the given temperatures between 300° C. and the softening temperature of the lead glass or crystal forming the article, a few hours contact only is needed to obtain the diffusion of some amount of the lead of said lead glass or crystal into said silico-aluminous crust.

In fact, surface analysis by ESCA and SIMS, spectrometry techniques have shown that, during said process there occurs a complex exchange between the $K+$ and $Pb^{2+}$ ions of the crystal and the $Al^{3+}$ ions of the kaloin, said exchange is therefore more complex than the one upon which the first explanation above was based and gives rise in the crystal container wall to a superficial silico-aluminous layer, of a thickness of about 100 nanometers (1000 Angstroms), forming an interfacial barrier which opposes the inter-diffusion of $Pb^{2+}$ ions of the solid and $H+$ ions of the acid liquid in contact. The alumina brought by the kaolin takes part to the formation of said highly stable superficial layer: such a layer persists after a thermal treatment at 520° C. for 17 hours, corresponding to aging several years at room temperature without contact with any liquid.

The silico-aluminous crust which remains on the wall at the end of the treatment is removed, e.g. by water washing, completed by some finishing, for instance by sand blasting, by ultra-sound treatment or the same.

An advantage of this process is the accuracy of its application conditions, which allow its carrying out upon any article of lead glass or crystal upon industrial equipment.

The invention will now be described with reference to some practical cases which demonstrate the efficiency of the process.

EXAMPLE 1

This example illustrates a specific application of the process of the invention to the treatment of flasks made of crystal containing 30 weight percent lead oxide designed to be filled with Cognac.

The flask has a content of 750 ml.

A barbotin (slip) is prepared from a commercial kaolin sold in France by the firm Société LAMBERT RIVIERE under trademark "KAOLIN HEAVY". This product is of high purity, having a maximum impurity content of:

| Calcium | 250 ppm |
|---|---|
| Heavy metals | 25 ppm |
| Chlorides | 250 ppm |
| Sulfates | 0.1% in weight |
| Acid soluble substances | 10 mg | the other properties being in accordance with the purity required by the European Pharmacopoeia of 1974.

After intimate mixture in a morter of:

| Heavy kaolin | 47 parts in weight |
|---|---|
| Water | 53 parts in weight |

The obtained barbotin (slip) is introduced in the flask and said flask is shake in to ensure a uniform coating of its entire inner surface. The excess of barbotin is drained.

The thixotropic properties of the barbotin enable the coating laid on the crystal to remain uniform at rest without any later flow.

The flask is then placed in an oven, the temperature of which is progressively raised up to 400°–440° C. and kept at said value during 4–6 hours.

The barotin crust is removed by water washing which carries most of the crust, then the remaining traces or veil of the crust is removed with a water/sand suspension, so that the article recovers its original aspect.

It should be noted that the treatment temperatures are close to the strain point of the crystal (440° F.), but still slightly lower to prevent any surface alteration or an excessive adherence of the kaolin crust after cooling.

Generally speaking, the barbotin can contain an amount of water between 40 and 60% in weight, depending on the specific kaolin used, its granulometry, its way of application (dipping, brushing and so on), the possible thixotropic additives and the shape of the treated article.

In the present specific case, the so treated flask is submitted to a durability test. It is filled with an aqueous solution containing 4% acetic acid, then the lead content of said solution is measured by atomic absorption every 24 hours.

The same measures are simultaneously made upon an identical flask but having not been submitted to the treatment.

After 750 hours (one month) the following results are noted:

| Flask | Pb content of the solution |
|---|---|
| Treated | non detected |
| Non-treated | 1.70 mg/l |

This test is therefore an evidence of the efficiency of the process.

The amount of lead which drifted into the koalin during the treatment was 2–3 mg.

The following tests show that the efficiency of the treatment according to the invention is sufficient for the liquids contained in the treated flasks to stay within the sanitary requirements quoted above.

To this effect, in a series of tests carried out along 6, 12, 24, 36 and 60 months (five years), using as liquids 4% aqueous acetic acid (pH=2.3) and a commercial alcohol such as a standard cognac (pH=3.5) the following results have been noted, as shown on Table 1 and on the curves of the drawing.

TABLE 1

A = Acid acetic in 4% aqueous solution, according to the process of example 1.
B = Alcohol (having an initial lead content of 16.8 µg/l)

| Lead Content of the liquid (µg/l) | TEST DURATION | | | | |
|---|---|---|---|---|---|
| | 6 months | 12 months | 24 months | 36 months | 5 years |
| A (Acetic acid tests) | 31.0 | 43.8 | 62.0 | 76 | 98 |
| B (Alcohol) | 13 | 18.3 | 25.9 | 31.6 | 40 |

These results (table 1 and corresponding curves A and B) should be interpreted in view of the following comments:

First, the five year tests are almost superfluous. In fact, the actual age of an alcohol, such as cognac, as mentioned on a crystal flask does not at all mean that said alcohol has been kept in said flask all the time during its aging; aging normally occurs in carboys or casks (generally oak casks), the flask being filled only when the alcohol is actually offered to the public: the effective contact time between the alcohol and the crystal is only the display time in the retailer shop, then the customer's consumption time which should logically not exceed some months, at most 2–3 years.

That's why the above tests have been conducted in real time during 12 months, then in artificial aging for 36 months and then extrapolated to 5 years, in accordance with the universally recognized Law of Fick, generally admitted in the field of ion migration speed, computed in terms of the square root of the time.

Second, it should be noted that the lead amounts passed into solution are substantially less for alcohol than for acetic acid. This is due to the higher pH of alcohol and the presence of further components in alcoholic beverages, such as cognac.

BRIEF DESCRIPTION OF THE DRAWING

The drawing is a graph showing the results of the treatments previously described.

Finally, it is of the utmost importance to observe that the highest lead content in alcohol, after five years, is only 40 µg/l, i.e. more than twice beneath the most severe maximal maximum content lead requirement up to now.

Figure 1:
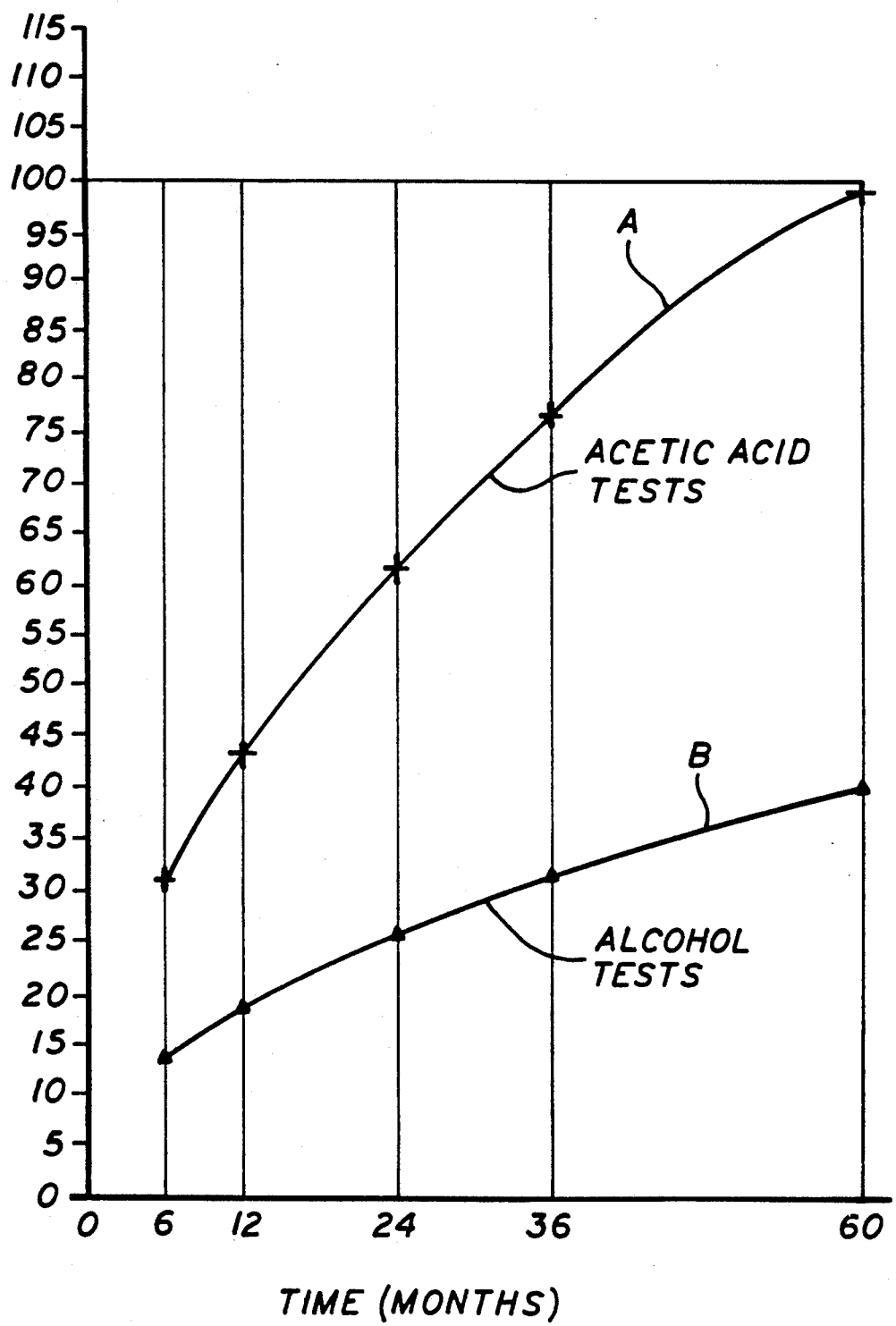

It can therefore be said that the process of the invention, carried out in the most extreme conditions, guarantees compliance with the most demanding legal requirements.

It should be well understood that this process is based upon experimental observations, some of them have been described above and that the present invention is not limited to and by any theory or hypothetical explanation.

In the present state of our knowledge, it is only possible to proposed different plausible hypothetical explanations for the efficiency of the process:

1. A simple $H^+/Pb^{2+}$ ion exchange between the crystal and the kaolin. Such a superficial depletion in lead of the crystal will minimize its later migration into the liquid.

2. A much more complex exchange between the most important cations of the crystal and the kaolin, generating the formation of a silico-aluminous diffusion barrier opposing the subsequent migration of the remaining lead.

It is highly possible that both explanations are correct and occur simultaneous, perhaps with further phenomena, the first prevailing at the beginning of the treatment, which means that in a first stage, in the absence of any barrier, the $Pb^{2+}$ ions would drift into the kaolin, said superficial depletion in $Pb^{2+}$ of the crystal being itself a first favourable result, then, as the operation progresses, initiation and development of said barrier, which opposes any further subsequent migration of the remaining lead into the liquid.

I claim:

1. An article made of crystal or lead glass which prevents migration of the lead contained in said crystal or lead glass into an acid product contained in said article produced by a process comprising the steps of:
   forming a silico-aluminous diffusion barrier on at least one surface of a crystal or lead glass article, wherein said crystal or lead glass contains at least 24 weight percent PbO.

2. An article according to claim 1, wherein the step of forming a silico-aluminous diffusion barrier comprises the steps of applying to at least one surface of said article a thixotropic layer capable of exchanging lead ions in said article with ions in said layer; and heating said article with said layer to a temperature between 300° C. and the softening temperature of said lead glass or crystal forming said article for a period of time sufficient to exchange at least a portion of said lead in said article with ions in said layer.

3. An article according to claim 2, wherein said layer is a thixotropic water suspension of hydrated aluminum silicate.

4. An article according to claim 2, wherein said layer comprises kaolin.

5. An article according to claim 4, wherein said article having said layer is heated at progressively elevated temperatures of up to about 400° C. to 440° C. for periods of time ranging from about 4 to 6 hours.

6. The article according to claim 2, wherein said layer is applied by filling said article with a thixotropic water suspension of hydrated aluminum silicate, and emptying said article, wherein at least a portion of said thixotropic suspension adheres to the interior surface of said article to create said layer.

7. The article of claim 6, further comprising cooling said article having said layer after said heating step, and removing the silico-aluminous lead-containing crust formed as a result of said heating step, said removing step being performed by at least one of the methods selected from the group comprised of:
   washing with a solution comprising water;
   sand blasting; and
   ultra-sound treatment.

8. An article formed of a lead containing material capable of storing acid products therein with reduced migration of lead into an acid product contained in said article, comprising:
   a container of crystal or lead glass, comprising at least 24 weight percent PbO, said container having inner and outer surfaces, wherein at least said inner surface has a silico-aluminous layer, said layer being capable of opposing migration of $Pb^{2+}$ ions in said container into an acid product placed in contact with said layer.

9. An article according to claim 8, wherein said layer has a thickness of about 100 nanometers.

* * * * *